Figure 6:
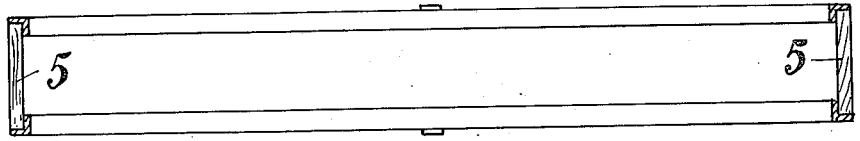

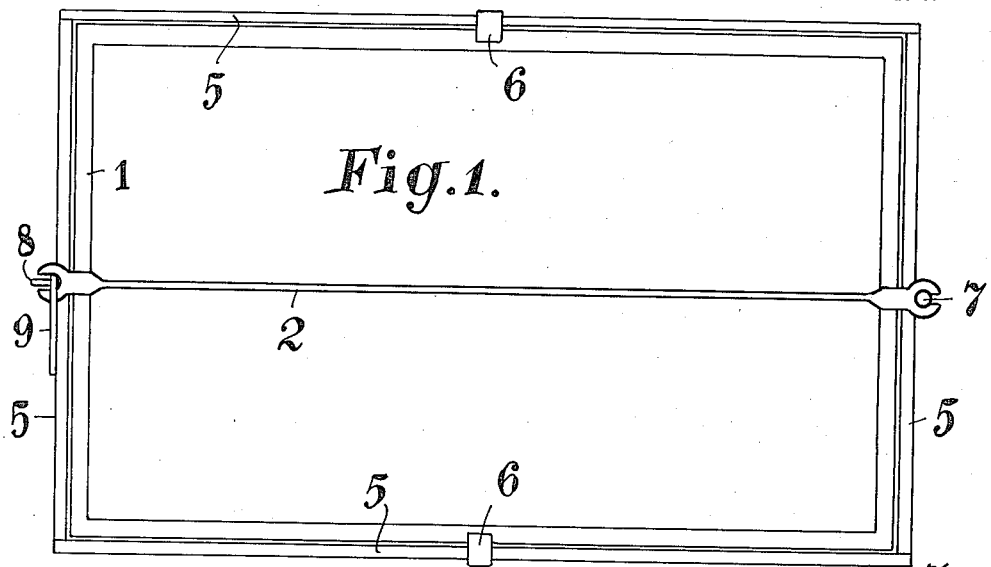

H. J. BULL.
METHOD OF PREPARING FISH FOR TRANSPORT.
APPLICATION FILED MAR. 15, 1915.

1,201,552. Patented Oct. 17, 1916.
5 SHEETS—SHEET 2.

H. J. BULL.
METHOD OF PREPARING FISH FOR TRANSPORT.
APPLICATION FILED MAR. 15, 1915.
1,201,552.
Patented Oct. 17, 1916.
5 SHEETS—SHEET 3.
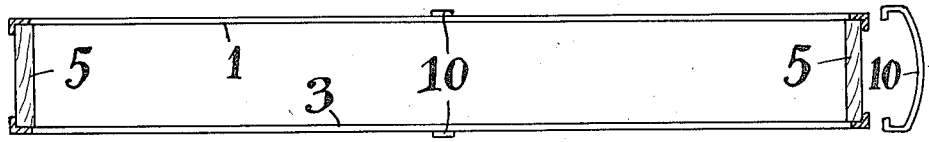
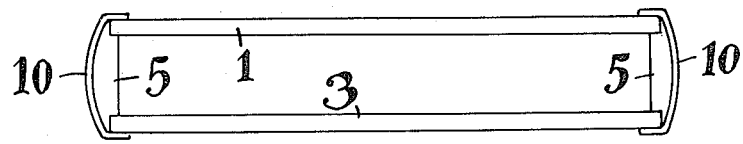
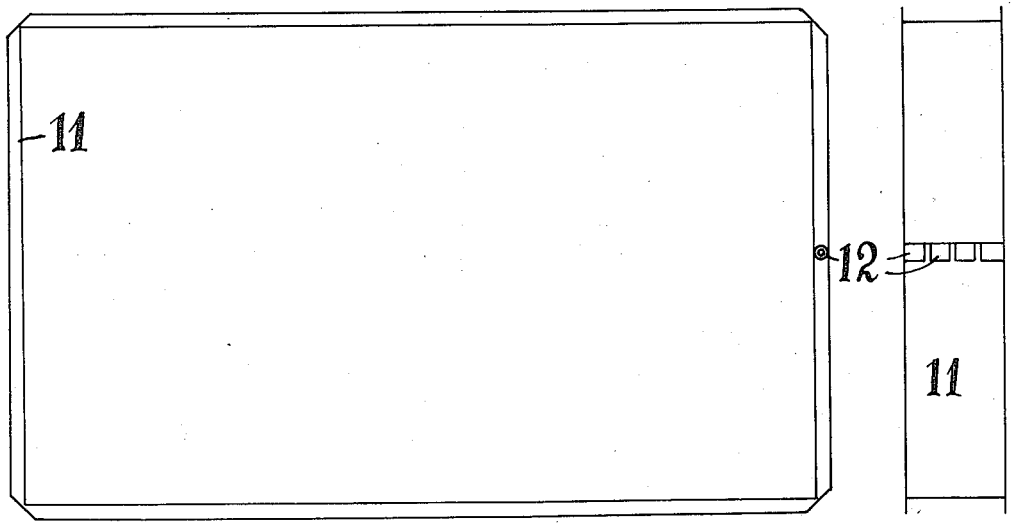
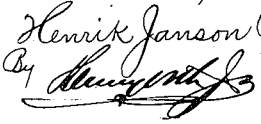

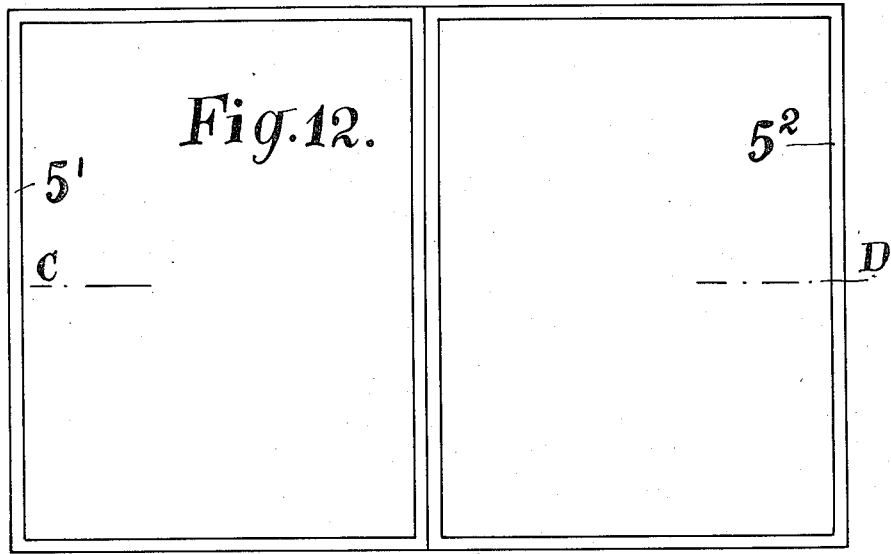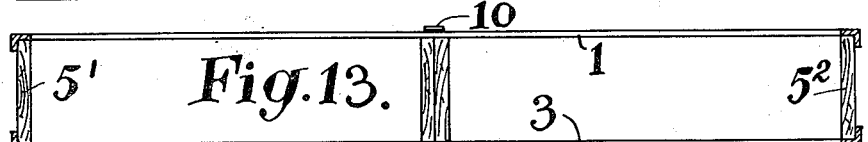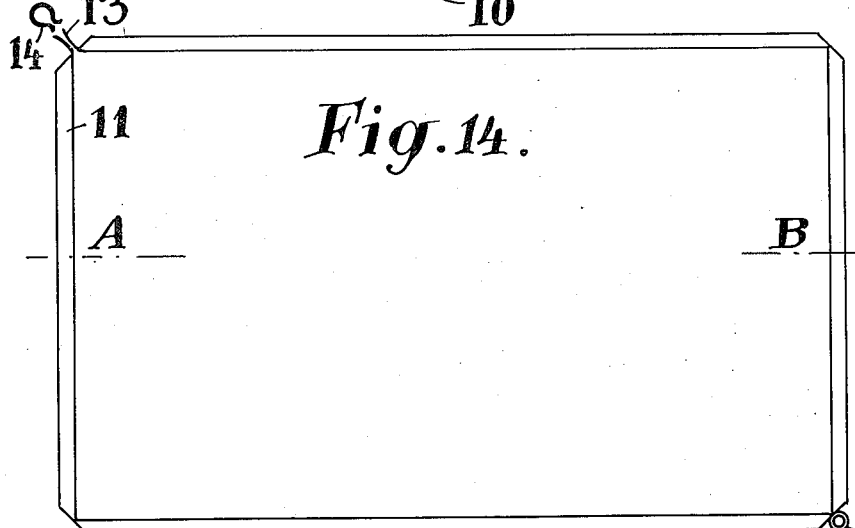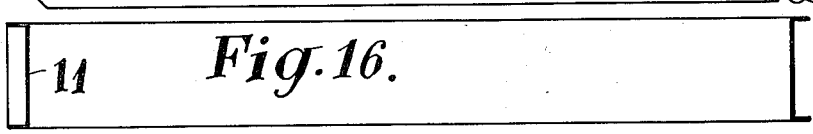

H. J. BULL.
METHOD OF PREPARING FISH FOR TRANSPORT.
APPLICATION FILED MAR. 15, 1915.

1,201,552.

Patented Oct. 17, 1916.
5 SHEETS—SHEET 5.

Inventor
Henrik Janson Bull,
By [signature] Atty

UNITED STATES PATENT OFFICE.

HENRIK JANSON BULL, OF BERGEN, NORWAY.

METHOD OF PREPARING FISH FOR TRANSPORT.

1,201,552.  Specification of Letters Patent.  Patented Oct. 17, 1916.

Application filed March 15, 1915.  Serial No. 14,469.

*To all whom it may concern:*

Be it known that I, HENRIK JANSON BULL, a subject of the King of Norway, residing at Bergen, Norway, have invented certain new and useful Improvements in Methods of Preparing Fish for Transport; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the preservation of fish by means of freezing and has for its object a process and means for the freezing, storing and transport of fish.

When fishes are frozen singly they retain principally their original shape with the exception that the fish swell considerably especially around the abdominal parts and often assume a curved shape. When frozen herrings or other fish are to be packed many large cavities are produced between the single fishes so that the space of the cases is not fully utilized. To avoid this it has been usual to place the fish in low trays made of galvanized iron and thereupon carry the freezing into effect. To loosen the frozen block of fish from the mold it has then in most cases been necessary to warm the mold with the block of frozen fish in warm water, an operation, which is very laborious. Another disadvantage is that the low open shape of the trays has made it necessary during the freezing operation to place the trays in a substantially horizontal position and that the freezing in solid trays took place very slowly, because the cold producing medium only to a small extent would get into direct contact with the fish.

The present invention now has for its object a method of freezing fish in blocks by means of which the disadvantages referred to above are avoided while important advantages with regard to the packing storing and transport of the frozen fish are obtained.

In order that the mold filled with herrings or other fish, in which the freezing is to take place could be placed in any position desired during the freezing operation the mold is constructed in such a manner that the material is all around inclosed in the mold and in addition thereto the larger parallel walls of the mold are made of a material, which is easily penetrated by the cold such as iron netting, perforated sheet metal wicker-work or the like in order that the supply of cold shall take place unobstructed, the said materials being suitably fastened to a metal frame. Thereby detachable frames for the bottom and cover are formed. The narrow side walls of the mold may be made of sheet iron or of wood and may have a rectangular or circular shape. When the side walls are made of sheet iron a lock should be provided either at one of the corners or of the sides so that the mold could be opened and the frozen fish block removed after the cover and bottom have been taken off. When the side walls are made of wood for instance narrow case boards, which are nailed together, these side walls may be left on the frozen block so that they form a part of the case in which the storage and transport is to take place. Several such blocks could be united to one piece, so that the narrow edges of the side walls are in contact with one another, whereupon cover and bottom of wood are placed at the two ends, said cover and bottom being fastened by means of nails. One may also place a number of fish blocks provided with side walls of wood in a wooden case which is thereupon provided with cover, a better insulation against heat being thereby provided. This latter manner has also a further advantage in so far as the removal of one block after the other from the case is thereby facilitated.

As compared with the hitherto employed methods of freezing fish in blocks the present method as will be understood represents important advantages as to the convenience in packing, at the same time as it enables the packing of the fish in a small space, which in its turn again results in a reduction in the quantity of packing material, employed and in the cost of freight.

The accompanying drawings illustrate various embodiments of the means used according to the present invention in freezing, packing and transport of fish.

Figure 19:
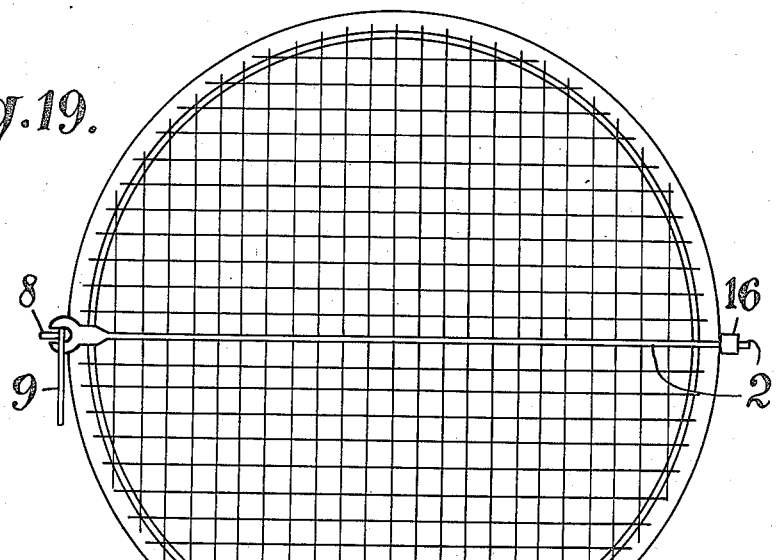
Figure 20:
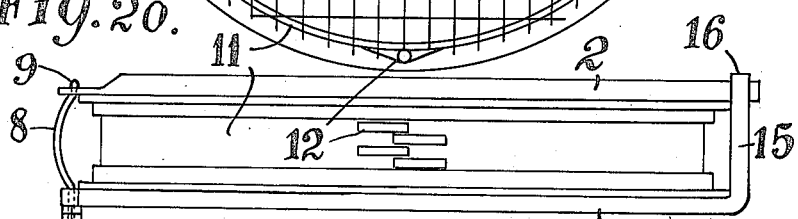
Figure 21:
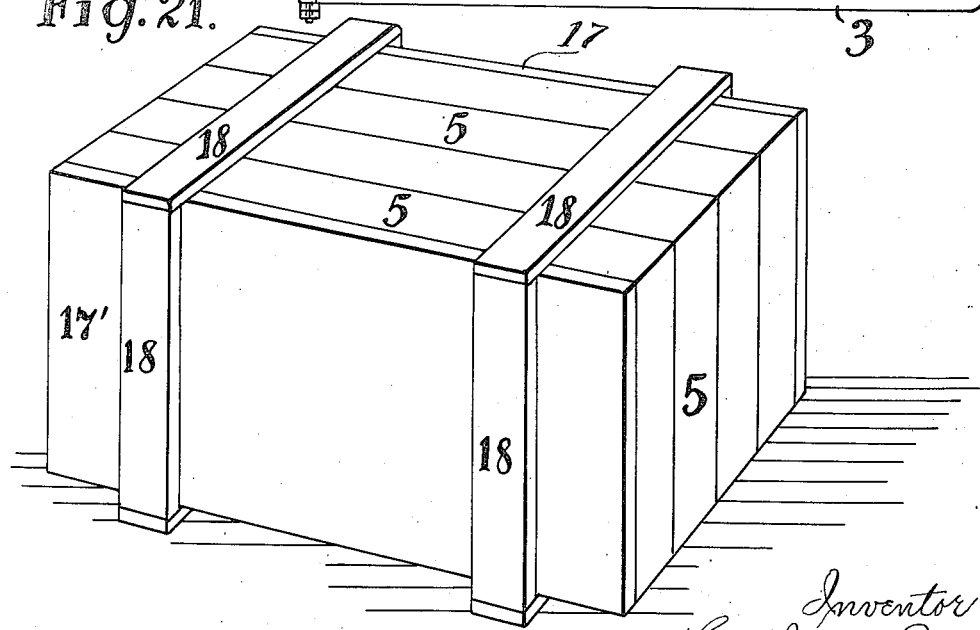

Figures 1 to 5 show a freezing mold with side walls of wood. The iron wire netting of the bottom and cover is not here shown. Fig. 6 shows a freezing mold of a somewhat modified construction. Figs. 7 to 11 show a freezing case, in which the bottom and cover overlap the side walls of the case. Figs. 12 and 13 show two cases with common bottom and cover. Figs. 14 and 15 show a freezing case with side walls of sheet iron. Figs. 16 to 18 show another case of this kind. Figs. 19 and 20 show a freezing case with a cylindrical side wall. Fig. 21 shows a number of blocks joined together for transport. Fig. 1 shows the closed mold seen from above. Fig. 2 is a sectional view of the same.

1 is a frame of angle iron for the cover upon which the iron netting is to be fastened. 2 is a flat iron rod, the left end of which is split, while the right end is forkshaped and is provided with a circular boring. This rod 2 may be loose or it may be secured to the iron frame 1. The bottom frame 3 is also made of angle iron and to the same is secured a rod of flat iron 4, whose ends are provided with eyes. The sides of the freezing molds consist of a square angled frame of boards 5 nailed together. In order that these boards shall not bend outward when the mold is filled, small pieces 6 of angle iron are welded onto the frames 1 and 3. The mold being filled with fish, frames 1 and 3 are kept in position partly by the fish, partly by the angle pieces 6 engaging the frame 5 and by the bars 2 and 4.

Figure 7:
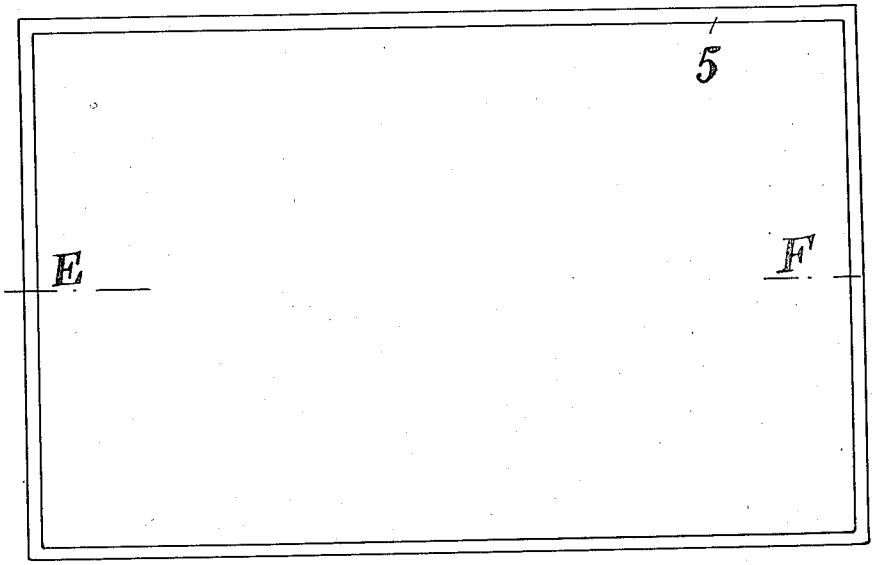
Figure 8:
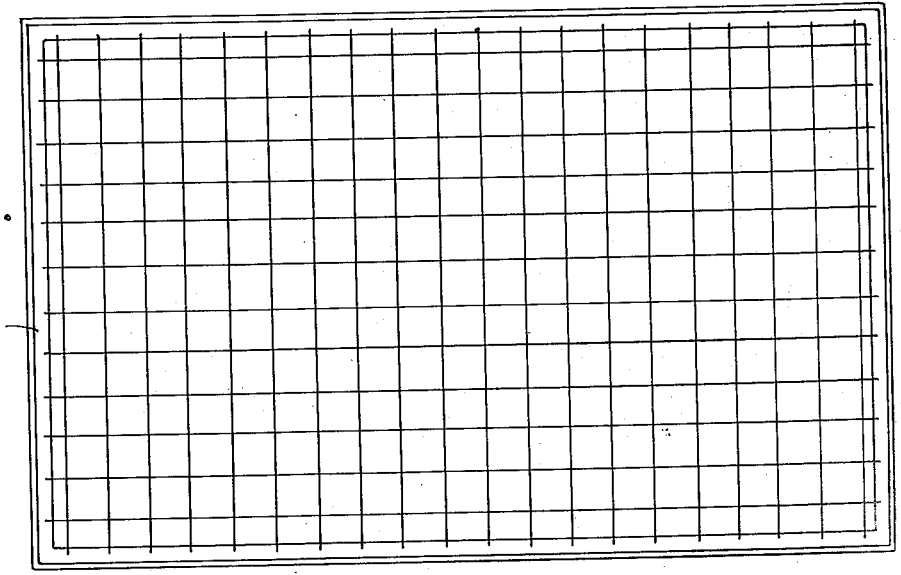

The bolts 7 and 8 serve to keep the mold parts together after the mold has been filled. The firstnamed one is a straight bolt secured to the bar 4. The other bolt 8, which in Figs. 3, 4 and 5 is shown on a natural scale serves as a lock and as a handle for the mold. The bolt 8 is revoluble about 90° in the eyeshaped end of the bar 2. When the mold has been filled with fish, the right split end of the rod 2 is put under the bolt head 7, the rod 9 is placed in the same direction as the rod 2, whereupon the cover is laid quite down to the left end of the rod 2 and slides down past the arm 9. By turning the arm 9 back the left end of the rod 2 and consequently also the cover is laid down. At the same time the bent part of the bolt 8 has arrived to the position shown in Figs. 2, 3 and 4, so that it could be used as a handle. When the filled mold is now hung up by means of the handle 8 it is maintained in a closed condition by its own weight. When the freezing operation is finished the rod 9 is turned back and the bottom and cover could then easily be removed from the frozen fish block, which sticks to the wooden frame 5. As will be seen the wood frame surrounds the cover as well as the bottom frame. The same applies also to the mold shown in section in Fig. 6. In Figs. 7 to 11 however a mold is shown in which the bottom and cover frames surround the wooden frame. In this case the bottom and cover frames are of the same shape (illustrated in Fig. 9). The wooden frame is shown in Fig. 7. In Figs. 10 and 11 sectional and side views of the closed mold are shown; 10 represent resilient clips of steel serving to secure the bottom and cover in place. Fig. 8 shows the bottom frame.

Fig. 12 shows two wooden frames $5^1$ and $5^2$ by the side of one another. Fig. 13 shows the same frames between a bottom and a cover frame.

Figs. 14, 15 and 16 show side frames of sheet iron with bent edges. They are made of two pieces, which are held together in one corner by means of a catching hoop 14 and in the other corner by means of a hinge lock 12. In Figs. 17 and 18 is also shown a side frame of sheet iron held closed by means of a hinge lock 12, which is in this case arranged on one of the sides. The closing is effected by inserting a rod through the hinge lock. The cover and bottom frames described above are used also in this case.

When the fish has been frozen in a mold as that above described the cover and bottom frames are first removed, whereupon the side frame is opened and detached from the frozen block.

Figs. 19 and 20 illustrate a round freezing mold seen from above and from the side respectively. The cover and bottom frames consist of circularly bent angle iron to which iron wire netting is secured. The side wall frame consists of a circularly bent sheet iron piece 11 which at each end is provided with two eyeshaped flaps 12. The side frame is closed by inserting a rod through these four eye flaps. The cover as well as the bottom frame overlap the side wall frame. The closing arrangement is substantially the same as that shown in Figs. 1 and 5 with the exception that the cross rod 3 is at the right end bent upward at a right angle (at 15) its end being here bent backward about an angle of 180° whereby a loop 16 is formed, through which the end of the other cross bar 2 is inserted.

Fig. 21 shows how four blocks of fish frozen in wooden side frames 5 may be connected together to one piece for transport. Upon this aggregate is then placed a cover 17 and bottom 17', and the whole is united by means of eight cross boards 18. Instead of such cross boards there may be used iron hoops surrounding the whole aggregate in which case it may also be unnecessary to put on the cover and bottom.

The filling of the freezing molds is effected in the manner, that the side frame is first placed on the bottom frame, whereupon the fish or the herrings are filled in. The cover frame is then put on and the whole is closed by means of the closing mechanism. When the freezing operation is finished the opening of the mold and the removal of the frozen block is carried out in the opposite order of that described in connection with the filling operation.

Owing to the fact that the sheet iron side walls are provided with a closing mechanism the side walls could without difficulty be removed from the block without necessitating a heating of the said side walls. In the case of wooden side frames being made use of a quite analogous mechanism may be provided for closing and opening the frame so that also such wooden frames could be easily removed from the block.

I claim:

1. The method of preparing fish for transport which comprises, packing the fish in a peripheral frame between perforate covers, passing a freezing medium through said covers and the contents of said frame, and removing the covers.

2. The method of preparing fish for transport which comprises, packing the fish in a peripheral frame between perforate covers, passing a freezing medium through said covers and the contents of said frame, removing the covers, and assembling in register a plurality of such frames with their frozen contents.

3. The method of preparing fish for transport, which comprises, packing the fish in a peripheral frame between perforate covers, passing a freezing medium through said covers and the contents of said frame, removing the covers, assembling in register a plurality of such frames with their frozen contents, and securing the assembled frames in a unit.

4. The method of preparing fish for transport, which comprises, packing the fish in peripheral frames, maintaining the fish therein between perforate covers, passing a freezing medium through the contents of the frames while the latter are in an upright position, removing the covers after freezing the fish, assembling a plurality of frames in register, closing the end frames with imperforate covers, and securing the assembled frame together.

5. A new article of commerce consisting of a plurality of separable shallow frames open at their ends, each having frozen fish packed therein and assembled in register and connected together as a unit.

In testimony that I claim the foregoing as my invention, I have signed my name in presence of two subscribing witnesses.

HENRIK JANSON BULL.

Witnesses:
N. HÖJDAHL,
MIKAL TJELLANGER.